United States Patent [19]

Lassche

[11] Patent Number: 4,830,167
[45] Date of Patent: May 16, 1989

[54] DEVICE FOR CONNECTING AND DISCONNECTING A BODY TO BE TEMPORARILY RETAINED WITH AND FROM A HOLDER RESPECTIVELY

[76] Inventor: Jakob Lassche, No. 45 Wiesenwegle, 7230 Schramberg, Fed. Rep. of Germany

[21] Appl. No.: 548,702
[22] Filed: Nov. 4, 1983

[30] Foreign Application Priority Data

Nov. 12, 1982 [NL] Netherlands .................. 8204402

[51] Int. Cl.⁴ ............................................ G07F 17/10
[52] U.S. Cl. ............................ 194/247; 70/225; 70/235; 70/DIG. 41; 211/5
[58] Field of Search .............. 194/40, 49, 64, 247, 194/253, 259, 287; 211/5, 19, 20; 70/225–228, 233–235, DIG. 41

[56] References Cited

U.S. PATENT DOCUMENTS

| 506,675 | 10/1893 | Devore | 211/20 X |
| 565,058 | 8/1896 | Westphal | 211/5 X |
| 608,769 | 8/1898 | Gilmer | 194/40 |
| 3,815,721 | 6/1974 | Montoya et al. | 194/40 |
| 4,433,787 | 2/1984 | Cook et al. | 194/40 |

FOREIGN PATENT DOCUMENTS

| 121824 | 7/1901 | Fed. Rep. of Germany . |
| 602424 | 12/1925 | France . |
| 790304 | 9/1935 | France . |
| 223458 | 3/1943 | Switzerland . |
| 234695 | 2/1945 | Switzerland . |

Primary Examiner—F. J. Bartuska
Attorney, Agent, or Firm—John P. Snyder

[57] ABSTRACT

A device for retaining a body which may be a bicycle wheel includes an automatic locking mechanism normally disposed in inoperative position but moved to operative locking position when the body is moved into place. A manual release mechanism is provided to allow the body to be removed and a coin operated mechanism is also provided to retain the locking mechanism in operative position until a key allowed of removal by actuation of the coin operated mechanism is reinserted and turned. The actuation of the coin operated mechanism blocks operation of the manual release mechanism until the key is reinserted and turned.

24 Claims, 11 Drawing Sheets

DEVICE FOR CONNECTING AND DISCONNECTING A BODY TO BE TEMPORARILY RETAINED WITH AND FROM A HOLDER RESPECTIVELY

The invention relates to a device for connecting and disconnecting with and from a holder respectively by means of a lock a body to be retained, for example, a bicycle, a barrier, a swing gate or a different body.

Such a device is known. For retaining a bicycle this known device comprises a pole anchored in the ground and provided with a bracket for holding a bicycle frame in the upright position and with a retaining chain connected with the pole and adapted to be locked with a key. Fastening a bicycle to such a device requires more manipulations than putting a bicycle up in a stand. For passing around the chain and fastening the lock the user needs at any rate both hands. When the bicycle is loaded with purchases, this may be an inconvenience which hinders practical use.

The invention has for its object to construct a device of the kind set forth in a manner such that no additional manipulations are required for connecting the body to be retained with the holder.

This is achieved by a device of the kind described characterized by a holder having an entrance opening for the body, by at least one member arranged on the holder for retaining in the holder the body put into it, said retaining member being urged by the body against spring force out of an inoperative position into the retaining position, by a mechanism co-operating with the retaining member for locking this retaining member in its retaining position, by an externally, for example, manually operable member for unlocking the locking mechanism and by means operable by the lock for guarding and releasing the unlocking member in a manner such that in the inoperative state of the device the unlocking member guards the lock in its open position and in the retaining position of the device the lock can be operated and guard the unlocking member in its closed position.

A preferred embodiment is characterized in that the lock is constructed so that only in the closed position of the lock a key can be removed therefrom and be inserted therein.

It is possible to use a coin mechanism guarding the lock in its position and releasing the key for operation not until a coin is thrown in and the retaining member is moved into its retaining position.

The device embodying the invention preferably has the feature that the holder comprises a stop which is movable by the body against spring force and which is coupled by a spring or a catching pawl with the retaining member and the locking mechanism.

In this case the retaining member may be coupled with the stop by a spring and be formed by an arm pivotable about an axis, whilst the locking mechanism may be provided with a cam disc secured on the shaft and a springloaded pawl co-operating herewith, wherein the unlocking member may be positively coupled with said pawl.

In a further embodiment the retaining member is formed by a ring portion adapted to turn about its axis, one end of which co-operates with a catching pawl movable by the stop in the path of the ring, whilst the locking mechanism is provided with a lug arranged on said ring portion and a spring-loaded pawl co-operating therewith and the unlocking member is positively coupled with the last-mentioned pawl.

There may be used a construction in which the unlocking member is formed by a first bar adapted to turn about its axis and having a transverse arm for actuating unlocking member from the outside, by a control-member acting on said transverse arm, for example, a push-button and in which the lock actuates a second bar being parallel to said rotatable bar and being axially displaceable in a manner such that in the inoperative state of the device the transverse arm of the first bar guards the second bar against axial displacement by the lock and in the operative state of the device and in the closed state of the lock the second bar guards the first bar through its transverse arm against a turn.

The invention furthermore relates to a bicycle stand provided with a retaining device with a lock, a holder having at least one retaining member, a locking mechanism, an unlocking member and a lock, said holder being capable of receiving a part, for example, a wheel of the bicycle to be stored and retained.

Advantageously said bicycle stand can be provided with a retaining device of the type mentioned above, the movable stop of which carries a roller connected through a coupling member with the retaining member and the locking mechanism in such a way that these parts can only be operated after a given minimum rotation of said roller in the direction of rotation corresponding with the driving into the stand of a wheel of a bicycle. Such a bicycle stand has the advantage that it cannot be operated by e.g. the introduction of a piece of wood or the like so that it can be prevented that by misbehaviour a stand is made unusable by the fact that after the introduction of a piece of wood and the introduction of a coin the key can be removed from a bicycle stand, causing said stand to be unusable during a certain time, while further even the lock has to be replaced by another lock namely a specimen on which the stolen key does not fit.

Advantageously the coupling member comprises a friction-coupling member.

In order to ensure that by driving a bicycle wheel into the retaining device this wheel can make the stand to operate preferably the embodiment is used, the roller of which has a surface stimulating the frictional contact with the tire of the wheel of a bicycle to be retained. The roller may have generally the shape of a diabolo. Also the surface of the roller can be provided with ribs.

The invention will now be described with reference to a drawing of a number of arbitrarily chosen embodiments, to which the invention is, however, not limited.

The drawing shows in

FIG. 4 a schematic cross-sectional view of the device of FIG. 3,

FIG. 5 a schematic cross-sectional view like FIG. 4 of a device holding a bicycle having a comparatively large wheel;

FIG. 6 an elevational view like FIG. 5 of a holder receiving a bicycle having a comparatively small wheel FIG. 7 an elevational view like VII—VII in FIG. 6;

FIG. 8 an elevational view taken on the line VIII—VIII in FIG. 6,

Figure 1:
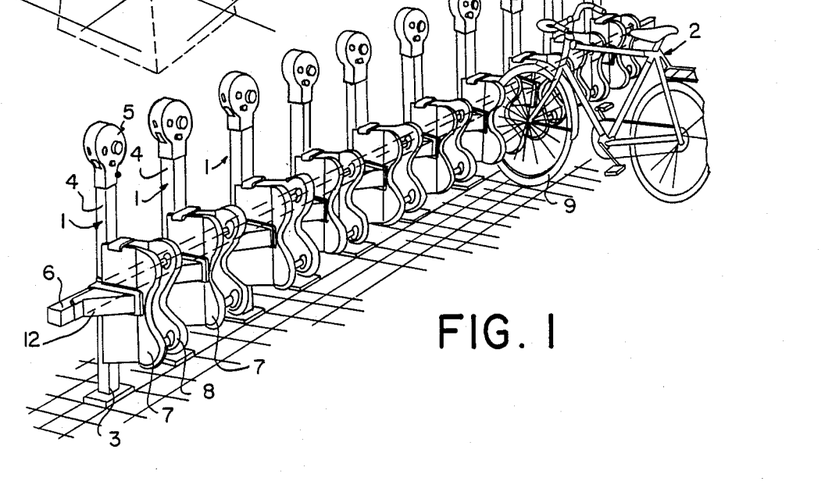
FIG. 1 a perspective view of a row of bicycle stands.

FIG. 1 illustrates a row of devices embodying the invention intended for retaining the front wheel of a bicycle 2. The devices 1 comprise a pole 4 anchored in the ground by a block 3 and having a coin lock 5 fastened to it. The poles 4 are laterally coupled with one another by a transverse beam 6, which enhances the rigidity of the row of devices 1.

Each pole 4 is furthermore provided with a holder 7 having an entrance opening 8 for the front wheel 9 of a bicycle 2, said holder being provided with means to be decribed hereinafter for retaining the front wheel of a bicycle.

The holder 7 comprises two plates 10, 11, which are coupled through prismatic supports 12 with the transverse beam 6 so that the plates 10, 11 can practically not be laterally deformed. At the top the plates 10, 11 are furthermore coupled with one another by a metal bridge part 13.

The coin lock 5 has a coin slot 14, a keyhole 15, a coin window 38 and a push-button 16. A trap 17 to be opened by the owner by means of a private key serves to empty the till from time to time.

Figure 2:
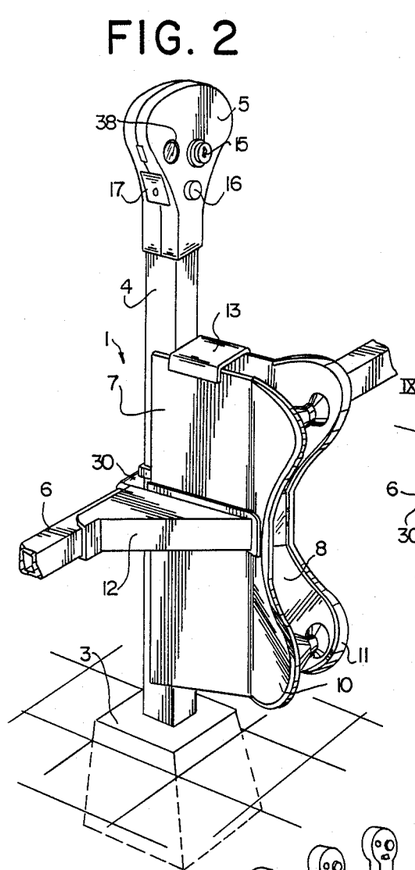
FIG. 2 a bicycle stand of FIG. 1 on an enlarged scale.

FIG. 2 shows further details.

Figure 3:
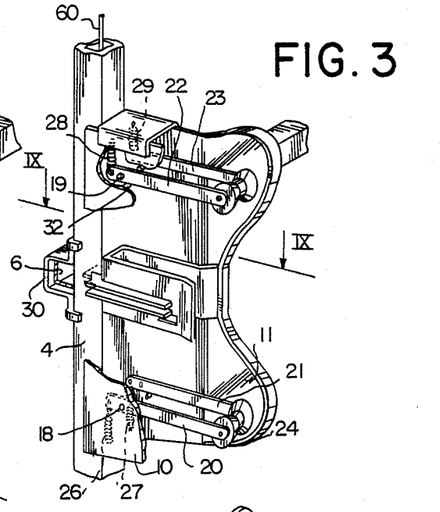
FIG. 3 a fragmentary elevational view of a holder of the stand shown in FIG. 2.

The elevational view of FIG. 3 shows two pairs of rocking arms 20, 21 and 22, 23 arranged between the plates 10, 11 and adapted to pivot about shafts 18, 19. At their ends directed to the entrance opening 8 the arms 20, 21 have a diabolo-shaped roller 24 of synthetic resin and the arms 22, 23 have a roller 25. At their other ends the arms 20, 21, 22, 23 are loaded by tensile springs 26, 27, 28, 29, which urge the rollers 24, 25 towards one another. This configuration ensures that a wheel in the entrance opening is engaged at several position of the circumference inter alia by the rollers 24, 25 so that without touching the plates 10, 11 a wheel assumes a stable position between the rollers 24 and 25 and a roller 40 to be described hereinbelow.

On the rear side the pole 4 is provided with a bracket 30 for coupling with the transverse beam 6.

Figures 4, 5, 6, 7, 8:
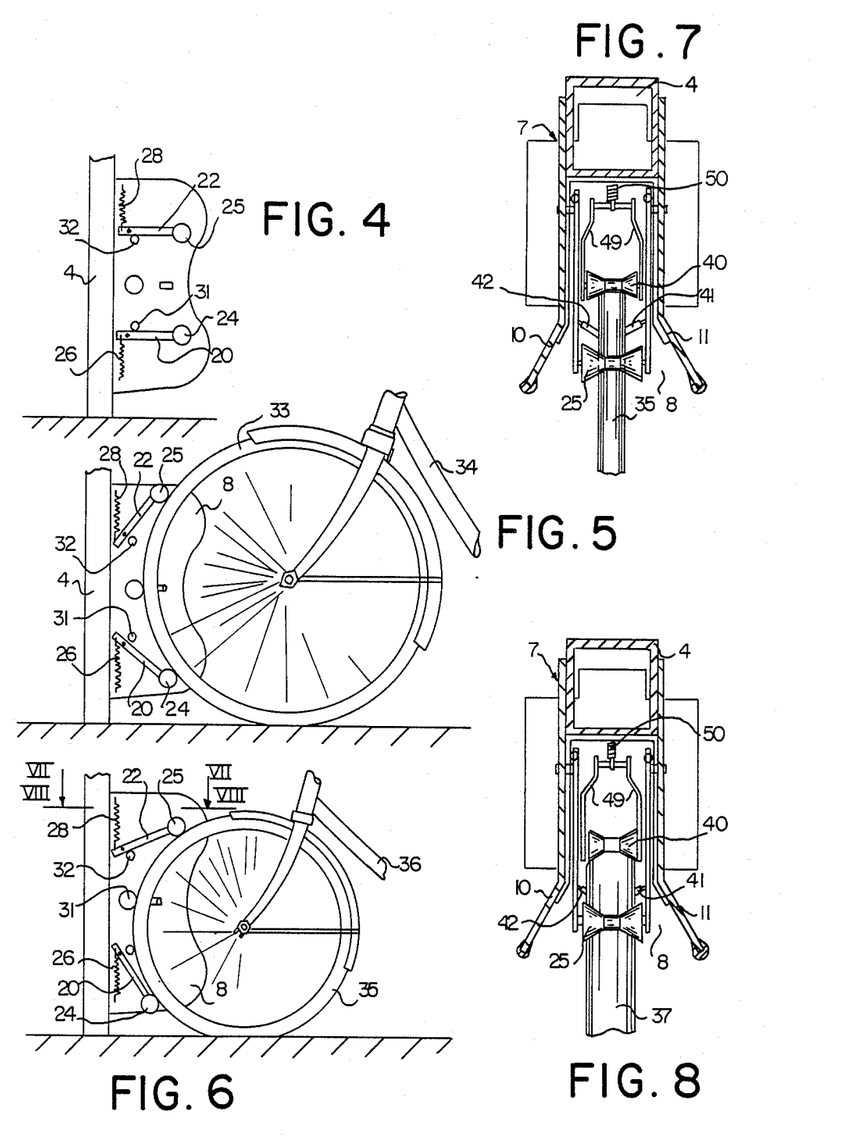

FIG. 4 schematically shows the position of the rocking arms 20, 22 in the rest position in which they are bearing on stops 31, 32.

FIG. 5 shows the position in a situation in which the front wheel 33 of a bicycle 34 has passed through the entrance opening 8 and has urged the rollers 24 and 25 downwards and upwards respectively.

FIG. 6 shows the position after the insertion of the front wheel 35 of a bicycle 36. The front wheel 35 is materially smaller than the front wheel 33 of FIG. 5. Nevertheless the present construction can provide an excellent stability also for this much smaller wheel.

FIG. 7 is an elevational view from which it will be apparent how the wheel 35 can be held in its stable position by the rollers 24, 25 and 40.

FIG. 8 shows in an elevational view corresponding to FIG. 7 a front wheel 37 having a considerably larger width than the front wheel 35 of FIG. 7, though it has the same diameter as the front wheel 35. Even for this broad front wheel 37 the device ensures full stability of the position of the wheel without the need for frictional contact with the plates 10, 11.

Figure 9:
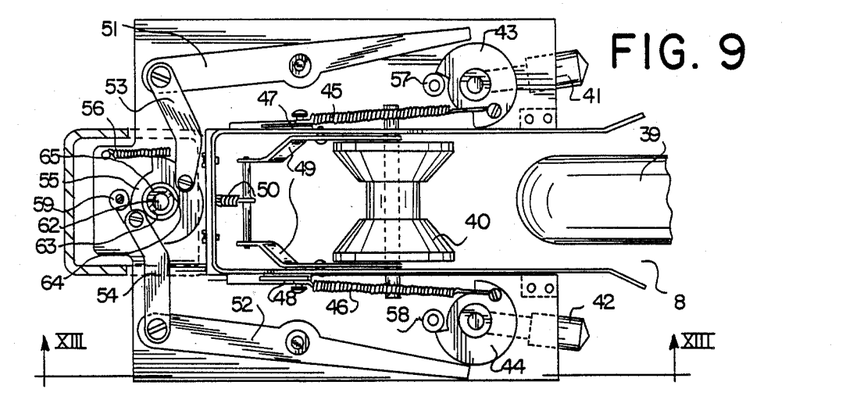
FIG. 9 a cross-sectional view of the device shown in FIGS. 2 and 3 in the phase preceding the introduction of a bicycle.
Figure 10:
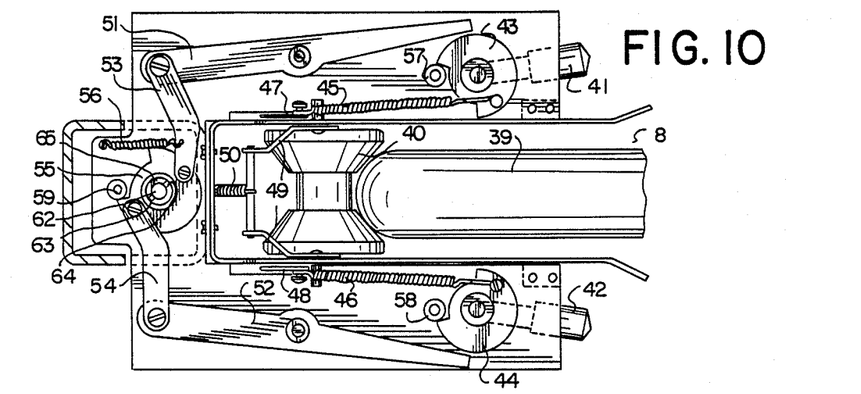
FIG. 10 an elevational view like FIG. 9 in a phase in which the bicycle is pressed home.

FIG. 9 shows a device embodying the invention in the free state, that is to say, in the state in which no front wheel of a bicycle is yet blocked. When introduced into the entrance opening 8 the front wheel 39 comes into contact with a roller 40, which serves for inwardly moving a retaining member formed by two pivotable arms 41, 42 to retain the front wheel 39 in a manner to be described further with reference to FIGS. 10, 11, 12, 13 and 14.

These pivotable arms are coupled with associated cam discs 43, 44, which can be rotated by a tractive force exerted on two springs 45, 46. The springs 45, 46 are coupled with the free ends of pivotable arms 47, 48, which can be displaced to the rear, i.e. to the left viewed in the drawing, under the influence of the displacement of the roller 40 when a front wheel 39 is inserted. The roller 40 is carried by a pivotable frame 49 and is urged into its rest position shown in FIG. 9 by a tensile spring 50.

Figure 11:
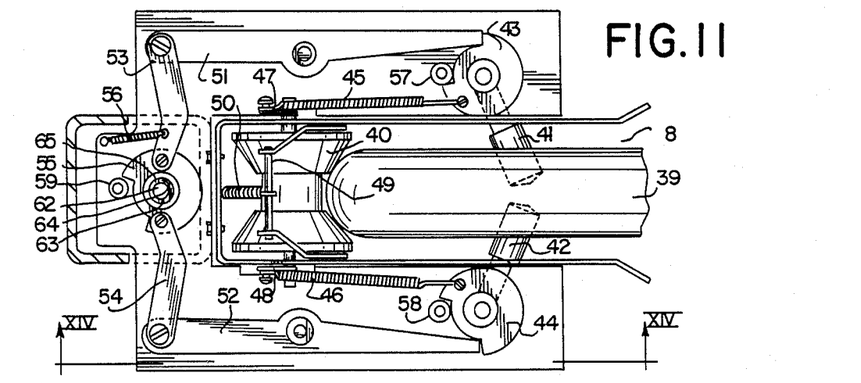
FIG. 11 an elevational view like FIG. 9 of the situation in which the bicycle is locked, but pressed by the tire against a resilient roller.

The cam discs 43, 44, as shown in FIG. 11, can be blocked for resetting the pivotable arms 41 and 42 by lever arms 51, 52, which are coupled through coupling arms 53, 54 with a further cam disc 55. The coupling arm 53 is engaged by a tensile spring 56, which urges the lower end of the coupling arm 53 and hence the part of the cam disc 55 coupled herewith to the left as viewed in the drawing. Therefore, as soon as the cam discs 43 and 44 have attained the position shown in FIG. 11, the corresponding ends of the lever arms 51, 52 will move in the direction of the rotary shafts of these cam discs 43, 44, so that the assembly is locked in the manner shown. Stop members 57, 58 serve to limit the stroke of the cam discs 43, 44. From FIG. 11 it will furthermore be apparent that in the locked state a displacement of the cam discs 43, 44 in both directions is blocked, that is to say, on the one hand by the lever arms 51, 52 and on the other hand by the stop members 57, 58.

A stop member 59 co-operates with the cam disc 55 for limiting the angular displacement thereof.

It will be obvious that blocking of the front wheel 39 by the arms 41, 42 can only be obviated by a displacement of the lever arms 51, 52 such that the cam discs 43, 44 are released for rotation. This can only be achieved by a corresponding rotation of the cam disc 55. Such a rotation can take place by rotating a shaft 60 coupled with the cam disc 55 in a manner to be described hereinbelow.

Figures 15, 16, 18, 19:
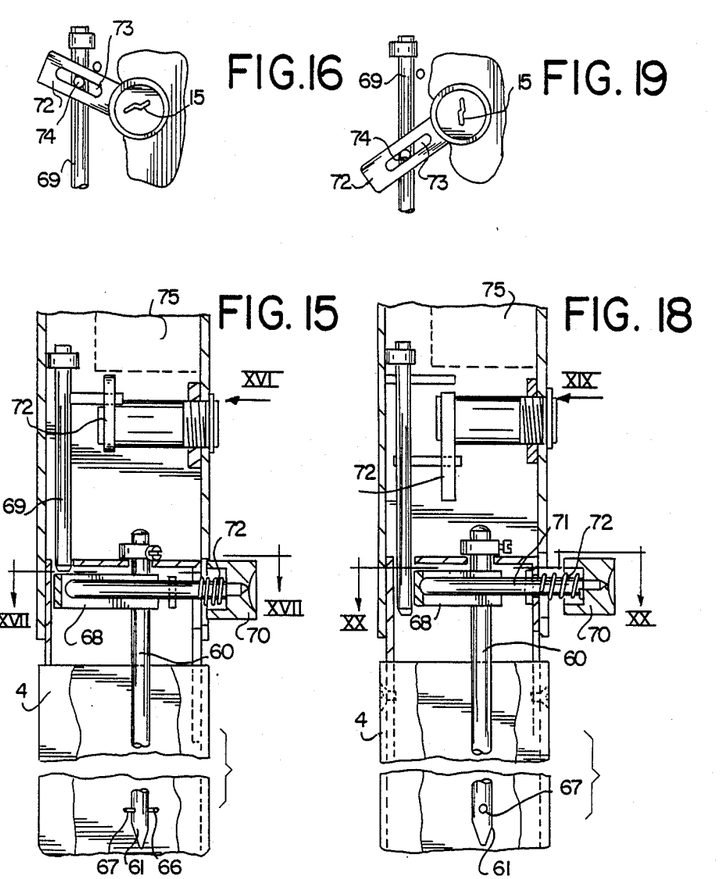
FIG. 15 a fragmentary side elevation of the unlocking mechanism with an automatic coin machine.
FIG. 16 a detail XVI of FIG. 15.
FIGS. 18, 19 and 20 elevational view corresponding to FIGS. 15, 16 and 17 respectively in the state in which the unlocking mechanism is blocked, whereas in FIGS. 15, 16 and 17 the unlocking mechanism is released.

FIG. 15 illustrates how via the shaft 60 a rotary movement can be produced for turning, as stated above, the cam disc 55 and hence for releasing the wheel 39 by displacing the pivotable arms 41, 42 into the position shown in FIGS. 9 and 10. The shaft 60 extends through the hollow pole 4. The lower end 61 has a tapering shape so that the shaft 60 can readily find the central aperture 62 of a cam disc 55. This central aperture 62 is surrounded by a sleeve 65 having two opposite slots 63, 64, into which fits the shaft 60. Extensions 66, 67 provided on the shaft 60 co-operate with the slots 63, 64. In this construction after assembling the rotation of the shaft 60 causes the cam disc 55 to rotate.

Figure 17:
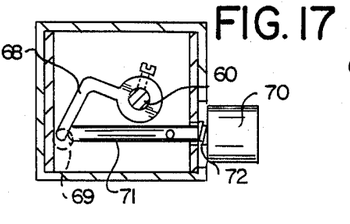
FIG. 17 an elevational view taken on the line XVII—XVII in FIG. 15.

The shaft 60 is coupled with a tag 68, which in the position shown in FIGS. 15 and 17 blocks a downward movement of a shaft 69. The tag can be moved into the position shown in FIGS. 15 and 17 by external, manual depression of a push-button 70, which engages the tag 68 through a pin 71.

The position shown in FIGS. 15, 16, 17 is the inoperative position of the device. In this position the key cannot be operated, even not after a coin has been thrown in.

The push-button 70 is urged outwards by the tension of a spring 72.

The vertical displacement of the shaft 69 can take place in the manner illustrated in FIGS. 16 and 19 by inserting a key (not shown) into the keyhole 15 and by turning the key so that a tag 72 is turned to exert a force via a slot 73 on a pin 74 coupled with the shaft 69 so that the shaft 69, which can only be displaced upwards and downwards, is shifted upwards or downwards respectively.

The broken lines schematically indicate an automatic coin machine 75, which co-operates with the device shown in a manner such that solely after the reception of the correct coin the key can be turned for locking the device and subsequently withdrawing the key.

Figure 12:
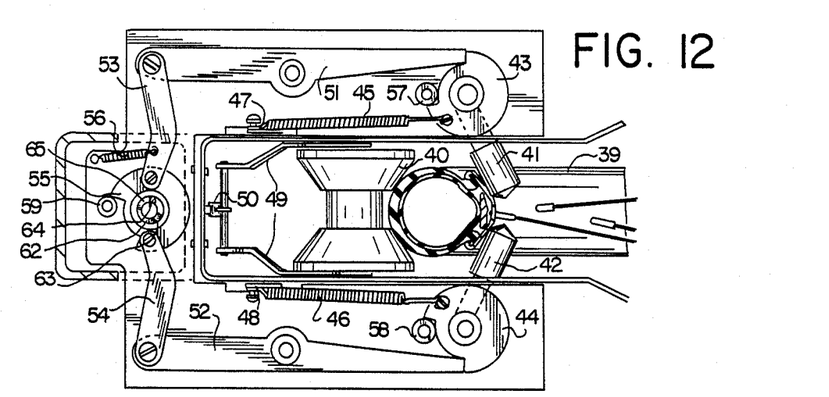
FIG. 12 the locked rest position in which the rim is urged against locking pins.
Figure 13:
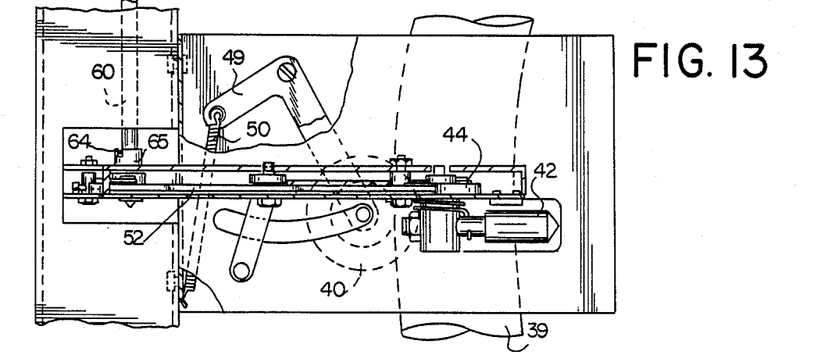
FIG. 13 a side elevation taken on the line XIII—XIII in FIG. 9.
Figure 14:
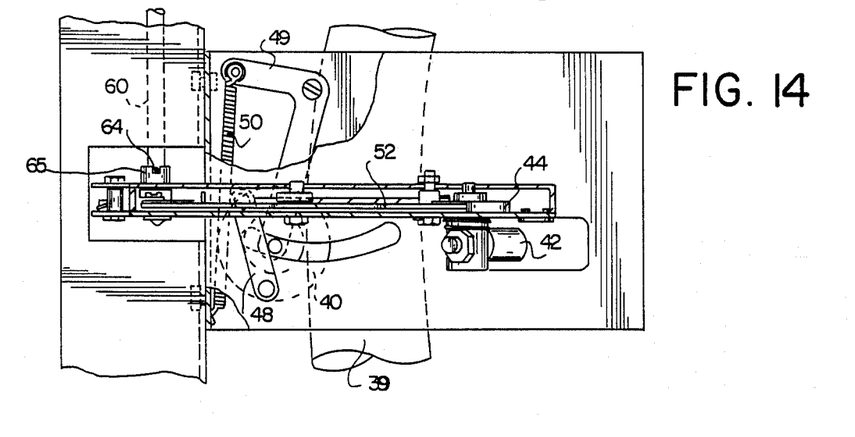
FIG. 14 a side elevation in the situation illustrated in FIG. 11 taken on the line XIV—XIV.
Figure 20:
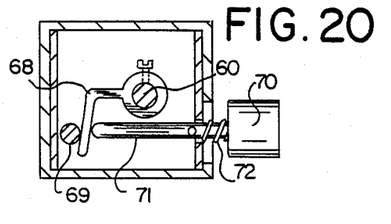

It should be noted that after the device embodying the invention is brought into the position shown in FIG. 12 and before the coin is inserted and the key is turned, blocking can be obviated by depressing the pushbutton 70. From the foregoing it will be obvious that this is still possible, since the displacement of the tag 68 is not yet blocked by the shaft 69. Locking can only become permanent by turning the key as shown in the position indicated in FIGS. 18, 19 and 20. This turn in itself can only take place after the correct coin is thrown in and after the front wheel is blocked as illustrated in FIG. 12.

FIGS. 21 to 25 show a further embodiment of the device in accordance with the invention. In this variant the retaining member is formed by a ring portion 76 adapted to turn about its axis, one end of which co-operates with a catching pawl, whereas the other end 79 can block, upon rotation, the entrance opening 8 of the device in the manner shown in FIG. 23. The ring portion 76 has a cam surface 80 and a pawl 82 co-operating herewith and loaded by a spring 81.

In FIGS. 21 to 25 the elements corresponding with those of the embodiment shown in FIGS. 9 to 14 are designated by the same reference numerals. Their description may be dispensed with.

Figure 21:
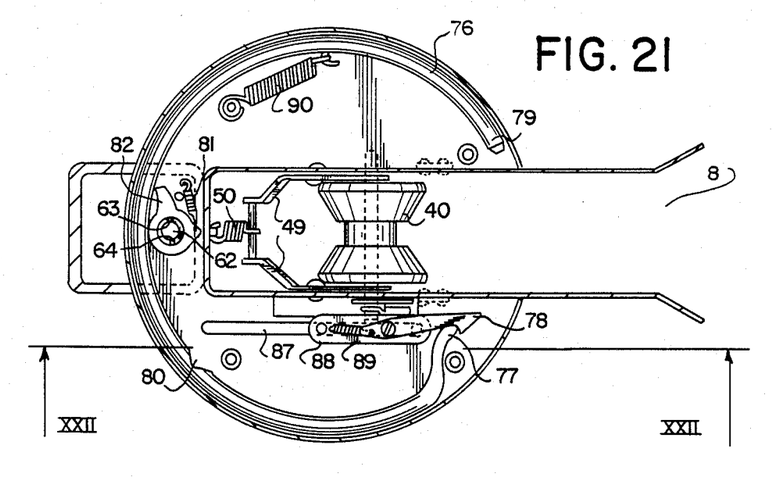
FIG. 21 a plan view of parts of a further embodiment.
Figure 22:
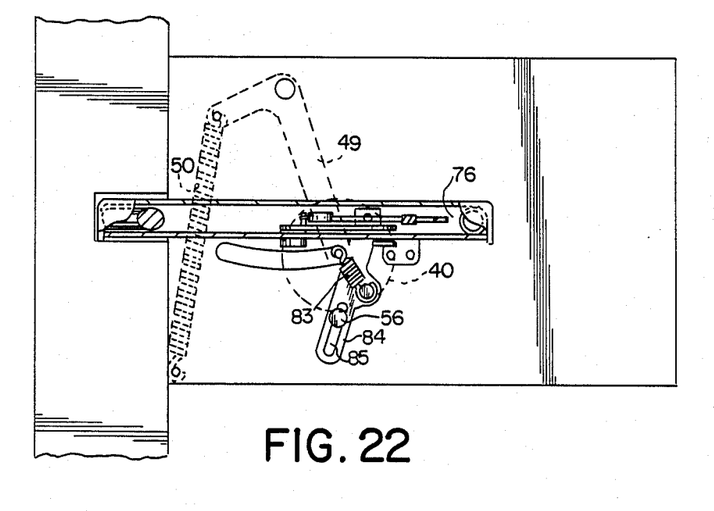
FIG. 22 a side elevation taken on the line XXII—XXII in FIG. 21.
Figure 23:
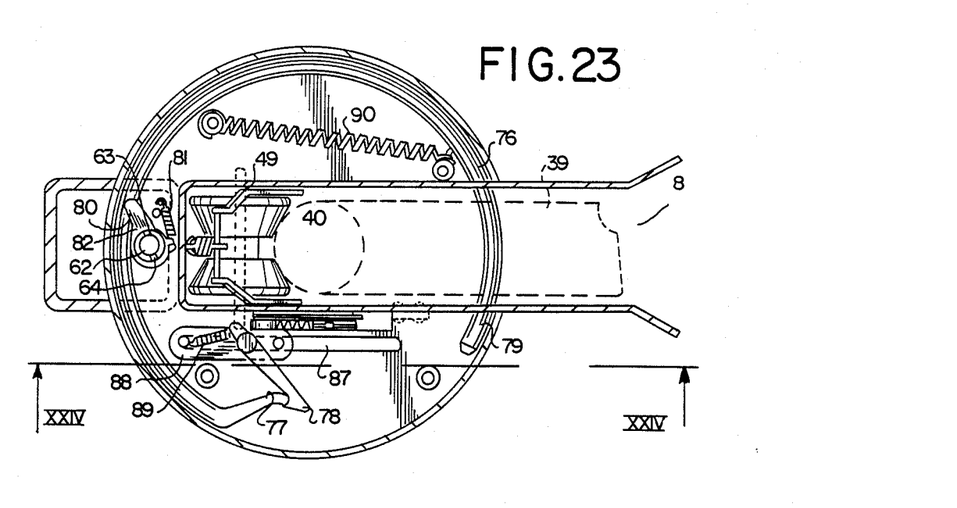
FIGS. 23 and 24 elevational views corresponding to FIGS. 21 and 22 in the closed state of the device.
Figure 24:
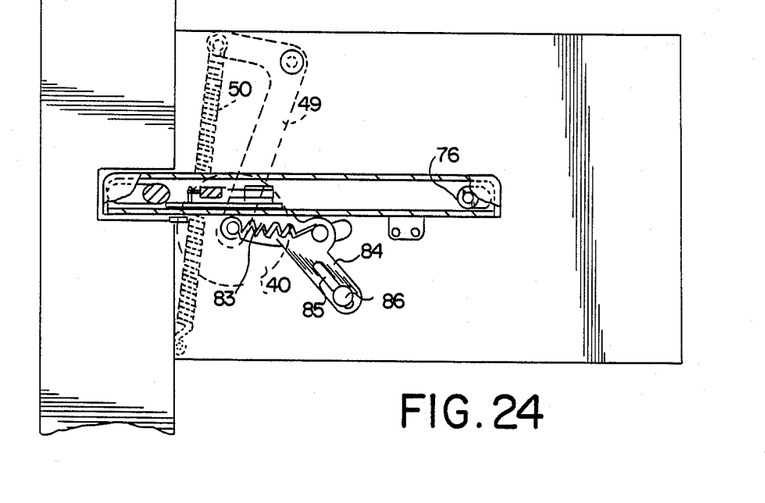

By displacing the roller 40 from the position shown in FIGS. 21 and 22 into the position shown in FIGS. 23 and 24 a tensile spring 83 exerts a tractive force on a catch 84, which can pivot through a slot 85 about a pin 86. To the top end of the catch 84 is pivoted a carriage 88 adapted to move horizontally in a slot 87 and having the aforesaid catching pawl 78 pivoted to it. The catching pawl 78 is urged by a tensile spring 89 in the axial direction of the carriage 88.

During the inward displacement of the roller 40 the carriage 88 is displaced to the rear, i.e. to the left as viewed in the drawing so that the catching pawl 78 exerts such a force on said end of the ring portion 76 that the latter is rotated into the position shown in FIG. 23. This rotation is performed against the tractive force of a spring 90. The situation illustrated in FIG. 23 is a rest position, since herein the cam surface 80 co-operates with the pawl 82. In analogy with the statements made with reference to FIGS. 9 to 20 it will be obvious that the co-operation between the cam surface 80 and the pawl 82 can solely be obviated by turning the shaft 60. In this respect reference is particularly made to FIGS. 15 and 20 and to the associated description.

Figures 25, 26:
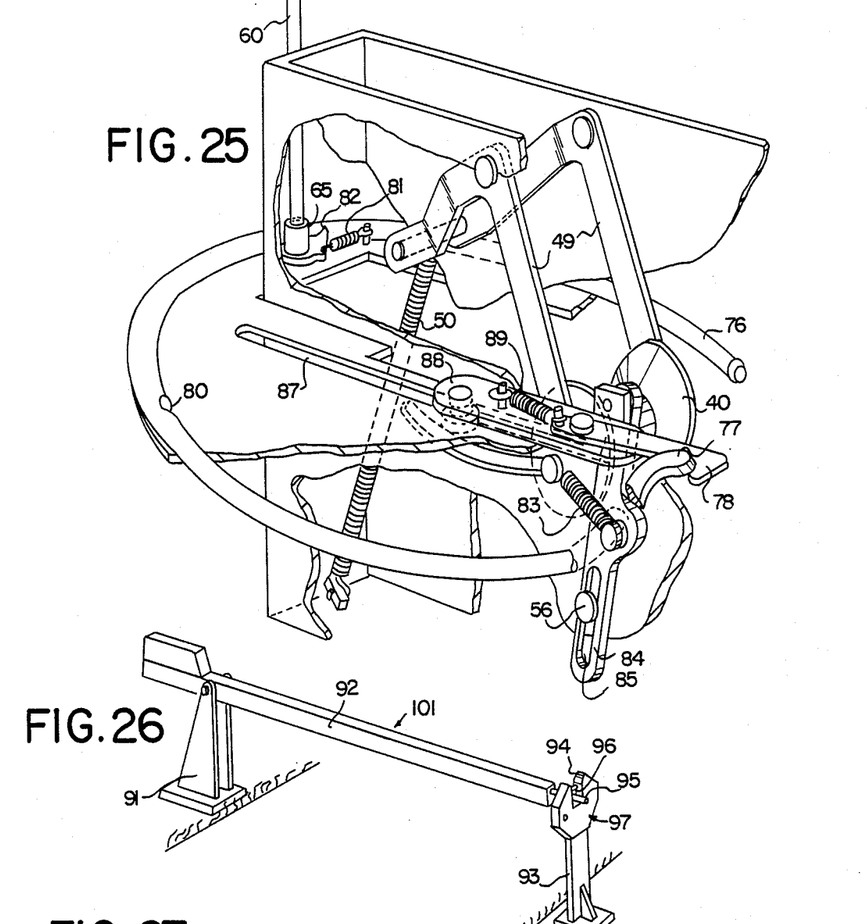
FIG. 25 a fragmentary, perspective view of the device of FIGS. 21 to 24.
FIG. 26 a barrier provided with a device embodying the invention.

FIG. 26 shows a device 90 comprising a barrier 92 supported by a frame 91, said barrier bearing in the horizontal position on a support 93, which has an entrance opening 94 for the free end 95 of the barrier, which opening can be closed by a retaining member 96 in the closed position of the barrier 92 shown in FIG. 26. The retaining member 96 corresponds to the ring portion 76 of the preceding embodiment. FIG. 26 does not show further details of the operation of the device 90 and of the locking mechanism 97. It will be sufficient to state that the locking mechanism 97 corresponds to the embodiment shown in FIGS. 21-25.

Figure 27:
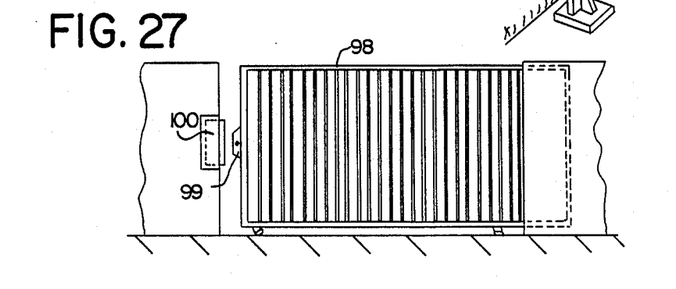
FIG. 27 a gate provided with a device in accordance with the invention.

FIG. 27 shows a horizontally mobile gate 98, which can be locked in a closed position by means of an ear 99 and a locking mechanism 100, which corresponds with that of FIGS. 21-25.

With reference to FIGS. 28 through 35 a description will now be given of a variant, in which the rotation of the roller 40 with the driving of a front wheel 39 of a bicycle into the retaining device is used for the operation of the retaining member and the locking mechanism, in such a way that only by driving into the stand a wheel of a bicycle the stand can be used and the key can be removed after introducing a coin.

Figure 34:
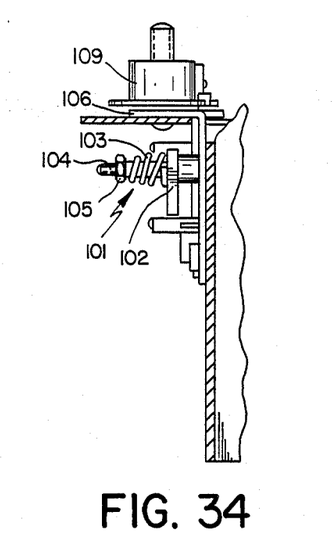
FIG. 34 front view of the friction coupling member according to FIGS. 28 through 33.

Different from the embodiments described hereinbefore the roller 40 is not fully idle but is through a friction coupling member 101 drawn in FIG. 34 coupled with a hook member 102. The friction coupling member 101 comprises a pressure spring 10, that cooperates with the hook member 102 at the one side and at the other side with a nut 105 provided on the shaft 104 of the roller 40, in such a way that by a rotation of the wheel 40 the hook member 102 can also be subjected to rotation.

In FIGS. 28 through 35 elements drawn and discussed before have been indicated by the same numerals as above. As far as not necessary their description will be omitted.

Figure 28:
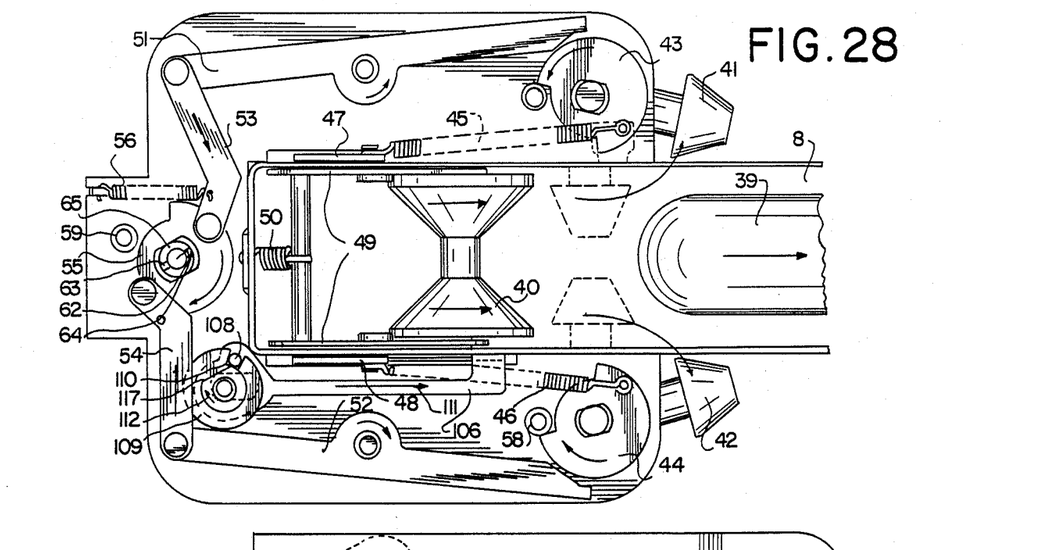
FIG. 28 a plan view broken away of a retaining device, the roller of which performs a role by the operation of the bicycle stand, the moment of unlocking and the making free of a wheel.
Figure 29:
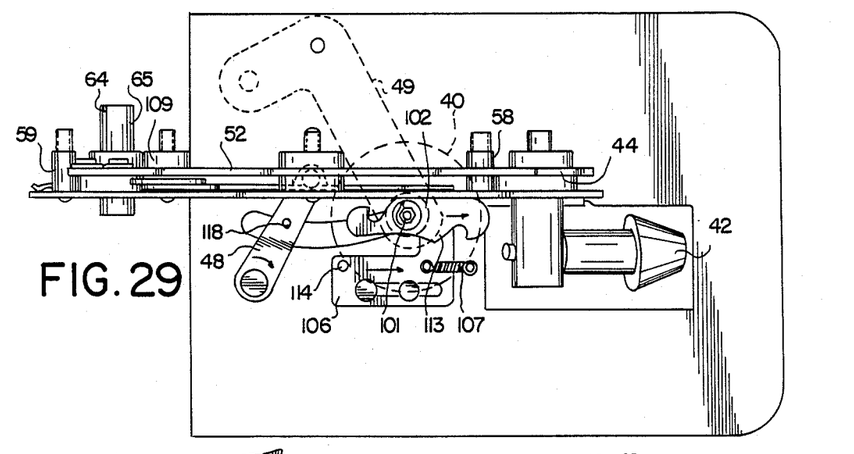
FIG. 29 a side view corresponding with FIG. 28.

FIG. 28 shows the moment of unlocking of the retaining device and the making free of the wheel 39.

A slide 106 can be shifted in horizontal direction and is urged by a pulling spring 107 into the right hand direction in the drawing, to a rest position. The slide 106 carries at its left hand end a pin 108 cooperating with a recess 110 present in a cam disc 199. Under the influence of the displacement of the slide 106 this cam disc 109 can rotate. During the displacement according to FIG. 28, indicated with an arrow 111 a corresponding rotation 112 of the cam disc 109 takes place.

Figure 30:
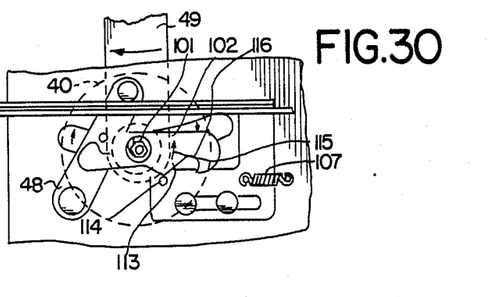
FIG. 30 a detail of the hook member according to FIG. 29 in its rest position.
Figure 31:
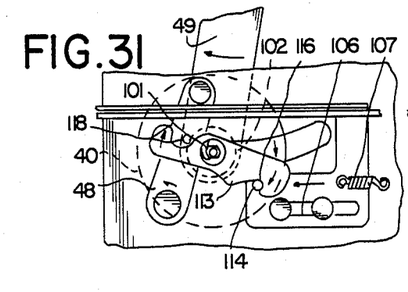
FIG. 31 a view corresponding with FIG. 30 at the moment on which the operation of the stand is started by the rotation of the roller.

FIG. 30 shows, how the hook member 105 at the shifting as a result of the presence of a protrusion 113 cooperating with a pin 114 present on the slide 106, is in first instance moved above in the direction of an arrow 115, and afterwards only by the subjection to a downward rotation of the hook member 102 as a result of the introduction of a wheel 39 is moved downwardly, in such a way that, as indicated in FIG. 31, it can be brought into a hooking cooperation with the pin 144 with a recess 116, so that with a displacement in the left hand direction of the hook member 102 the slide 106 is displaced as a result of the introduction over a further distance of the wheel 39.

Figure 32:
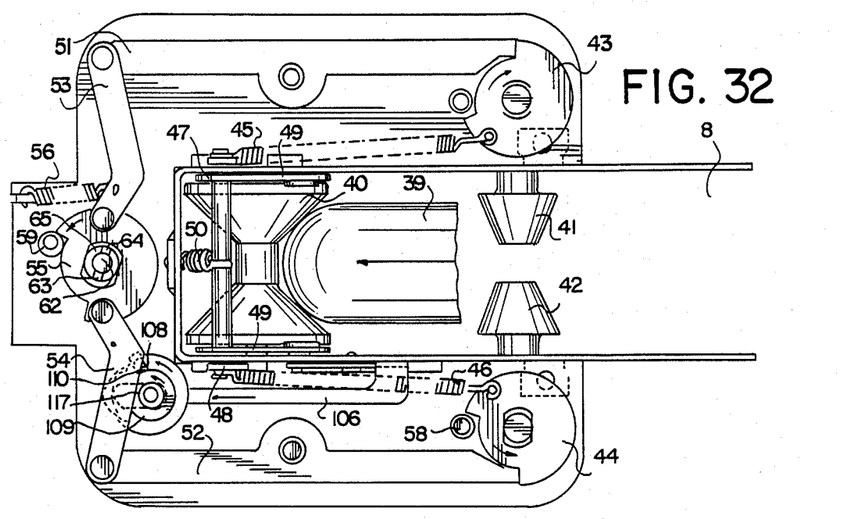
FIG. 32 a view corresponding with FIG. 28 at the moment on which a wheel has been driven into the retaining device.
Figure 33:
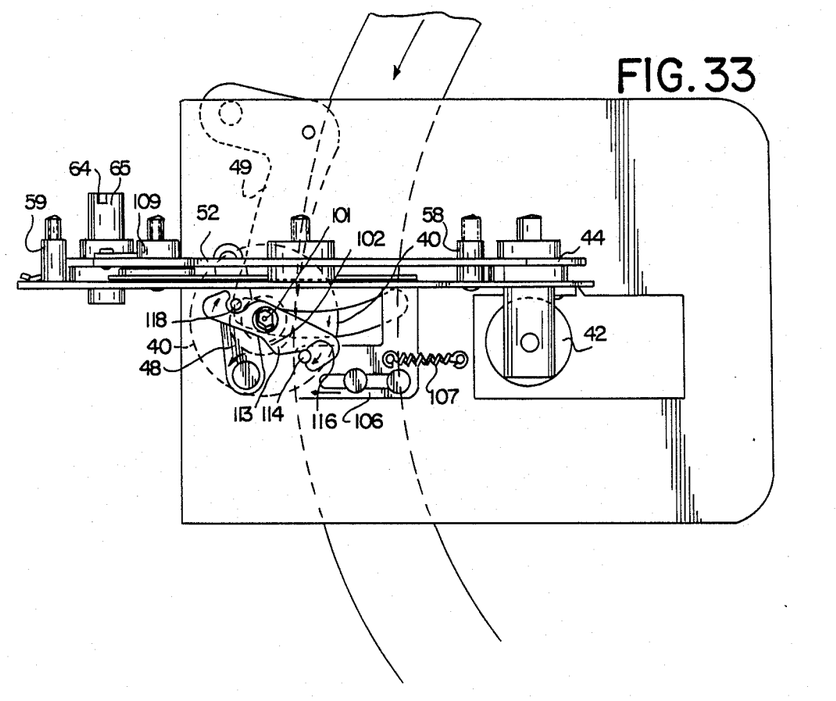
FIG. 33 a view corresponding with FIG. 29 on the moment corresponding with FIG. 32.

FIG. 32 shows the activation caused hereby of the locking by the introduced front wheel 39 in the situation, in which the hook member 102 has displaced the slide 106 into the left hand direction against the pulling spring 107. The cam disc 109 has been rotated by said displacement of the slide in such a position, that a flat face present on the disk 109 is in abutting relationship with the coupling arm 54, causing the cam disc 55 to abut to stopping member 59. The lip 68 (see FIGS. 15 through 20) gives free the opening of the shaft 69 so that in the way discussed with reference to the figures mentioned the key in the coin lock can be turned and removed from the lock.

It should be explicitly noted that the variant according to the figs. discussed here make the activation of the locking by means of e.g. a piece of wood impossible. In absence of rotation of the roller 40 or a rotation proceeded by a displacement, namely, no hooking cooperation takes place between the hooking member 102 and the slide 106 through the recess 116 and the pin 114 respectively. Therefore by this cause no shifting of the slide 106 takes place. Correspondingly the shaft 39 is blocked against displacement and the key cannot be removed.

Figure 35:
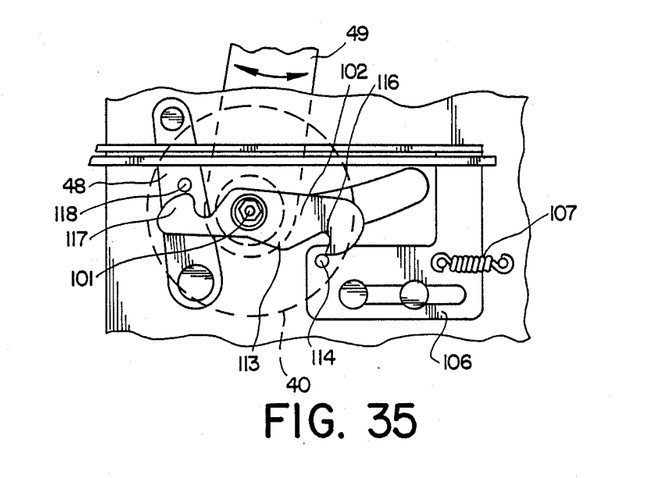
FIG. 35 a view corresponding with FIGS. 30 and 31 in the situation, in which without a rotation of the roller it is tried to make the retaining device to operate.

FIG. 35 shows that after trying to activate by means of e.g. a piece of wood of the hook member 102 in case of rotating the roller 140 the hook member 102 cannot be brought into hooking cooperation with the recess 116 on pin 114 of slide 106 afterwards. Such a hooking cooperation is, namely, prevented by a cam 117 cooperating in the manner shown in FIG. 25 in the situation with a pin 118 present on a swiveling arm 48.

Referring to the explanation hereinbefore it will be clear that the hooking cooperating can only take place in case of a simultaneous rotation and displacement into the left hand direction of roller 40, which in a normal case only takes place in case a bicycle wheel is driven into the stand.

The invention is not limited to the embodiments shown and described. It should be noted that the lock may be electrically remote-controllable. This may be important for a barrier or a gate.

The bicycle stands embodying the invention may be disposed, as will be apparent inter alia from FIG. 1, in the same manner as conventional bicycle stands, for example, as single stands and they do not occupy more space than the known stands.

In order to the destruction-proof character, if desired, the roller cooperating with a wheel can be adapted for cooperation with a bicycle tire in case of the variant according to FIGS. 28 through 35, whereto it is provided with a rough surface or a surface provided with ribs, but on the width of a rim without a tire is intentionally smooth, or even preferably provided with a plurality of flat faces. By the lawless introduction of a rim without a tire in this way it is achieved that the rim cannot activate the activation roller but performs a slipping movement relative thereto, so that the bicycle stand is not energized and the key cannot be removed.

I claim:

1. A device for connecting and disconnecting a body to be retained, comprising a holder presenting an entrance opening to receive said body, locking means responsive to reception of said body in said entrance opening for retaining said body in said holder, manual release means for retracting said locking means to allow the body to be removed from said holder, coin operated means for preventing retraction of said locking means by said manual release means, and further means for allowing retraction of said locking means subsequent to operation of said coin operated means.

2. A device as defined in claim 1 wherein said further means comprises a key released by operation of said coin operated means for subsequent use to allow operation of said manual release means.

3. A device as defined in claim 1 wherein said locking means prevents operation of said coin operated means until a body is received in said entrance opening.

4. A device as defined in claim 3 wherein said further means comprises a key released by operation of said coin operated means for subsequent use to allow operation of said manual release means.

5. A device as defined in claim 1 wherein said locking means includes resilient means for resisting movement of said body into said holder until said locking means moves to operative position.

6. A device as defined in claim 5 wherein said locking means includes a pair of retaining members swingable between inoperative and operative positions.

7. A device as defined in claim 5 wherein said locking means includes a ring rotatable from inoperative to operative position.

8. A device as defined in claim 5 wherein said locking means comprises a rotatable cam and said manual release means includes a shaft rotatable with said cam.

9. A device as defined in claim 8 wherein said shaft is provided with an arm which in the inoperative of the locking means is positioned in blocking relation to said coin operated means.

10. A device as defined in claim 1 wherein said locking means includes a roller which is rotated to operate said locking means.

11. A device as defined in claim 1 wherein said locking means includes a swingable roller to operate said locking means.

12. A device a defined in claim 1 wherein said locking means includes a retaining member and spring means normally urging said retaining member onto operative, locking position, and spring urged cam means for holding said retaining member in operative, locking position.

13. A device as defined in claim 12 including a shaft rotatable with said cam means and an arm on said shaft for blocking said coin operated means in the operative position of said retaining member.

14. A device as defined in claim 13 wherein said arm is positioned in the operative position of said retaining member for swinging movement in response to operation of said manual release means to release said locking means.

15. A device as defined in claim 14 wherein said coin operated means includes a blocking member movable into blocking position relative to said arm to prevent operation of said manual release means.

16. A device as defined in claim 15 wherein said locking means includes a pair of swingably mounted rollers for guiding the body within said entrance opening and a further roller for actuating said locking means.

17. A device as defined in claim 16 wherein said further roller is swingable and rotatable to actuate said locking means.

18. A device as defined in claim 17 wherein said pair of rollers are of diabolo shape for cooperation with a bicycle wheel and said further roller is also diabolo shaped for rotation by the bicycle wheel.

19. A device as defined in claim 15 wherein said pair of rollers are of diabolo shape for cooperation with a bicycle wheel and said further roller is also diabolo shaped.

20. A device for connecting and disconnecting a body to be retained, comprising a holder having an entrance opening to receive a body, normally inoperative locking means responsive to reception of a body within said entrance opening for automatic movement of said locking means for inoperative position into operative position to retain the body in the holder until said locking means is returned to inoperative position, and release means for returning said locking means from its operative to its inoperative position, said release means includes manual release means and coin operated means operating in conjunction with each other.

21. A device as defined in claim 20 wherein said coin operated operated means comprises a key which is removable when proper coinage has been feed to said coin operated means, removal of said key blocking operation of said manual release means.

22. A device as defined in claim 21 wherein said locking means blocks operation of said coin operated means and removal of said key when the locking means is in its inoperative position.

23. A device for connecting and disconnecting a body to be retained, comprising a holder having an entrance opening to receive a body and automatic locking means for operation from an inoperative position to an operative position in response to reception of a body in said entrance opening, thereby to capture and retain the body in the holder, manual release means rendered operable by movement of said automatic locking means to its operative position for returning said automatic locking means to its inoperative position and thereby releasing the body for removal from the holder, and coin operated means rendered operable by movement of said automatic locking means to its operative position for retaining said automatic locking means in its operative position and for blocking operation of said manual release means.

24. A device as defined in claim 23 wherein said coin operated means includes a key removable for subsequent use upon reception of the proper coinage in the coin operated means, the key upon removal effecting the retention of the automatic locking means in its operative position and the blocking of said manual release means.

* * * * *